United States Patent [19]

Senda

[11] Patent Number: 4,696,658

[45] Date of Patent: Sep. 29, 1987

[54] SHAFT COUPLER FOR COUPLING A ROTARY SHAFT OF AN IGNITION DISTRIBUTOR TO AN ENGINE CAMSHAFT

[75] Inventor: Eiichi Senda, Obu, Japan

[73] Assignee: Nippondenso Co., Ltd., Kariya, Japan

[21] Appl. No.: 792,008

[22] Filed: Oct. 28, 1985

[30] Foreign Application Priority Data

Oct. 31, 1984 [JP] Japan .................. 59-230788

[51] Int. Cl.$^4$ .............................................. F16D 3/16
[52] U.S. Cl. ...................................... 464/112; 464/102
[58] Field of Search ............... 123/146.5 A; 464/102, 464/104, 105, 106, 112, 113, 114, 147, 153, 155; 403/58, 287

[56] References Cited

U.S. PATENT DOCUMENTS

| | | | |
|---|---|---|---|
| 1,293,082 | 2/1919 | Goebler | 464/112 X |
| 2,813,409 | 11/1957 | Wolcott | 464/102 |
| 4,403,579 | 9/1983 | Young et al. | 123/146.5 A |
| 4,464,142 | 8/1984 | Bridges et al. | 464/104 X |
| 4,470,384 | 9/1984 | Umemura | 464/102 X |

FOREIGN PATENT DOCUMENTS 58-37966 3/1983 Japan.
994696 6/1965 United Kingdom ............ 464/114

OTHER PUBLICATIONS

Journal of Nippondenso Technical Disclosure No. 32-095, 10/20/83

Primary Examiner—Daniel P. Stodola
Attorney, Agent, or Firm—Cushman, Darby & Cushman

[57] ABSTRACT

A coupler for coupling up a rotary shaft of an ignition distributor to an engine camshaft comprises an annular member having a circular axial recess into which the rotary shaft loosely projects over one axial end of the annular member, at least one projection provided on the other axial end of the disk-like member for slidably fitting into a diametrical groove formed on a top end of the engine camshaft, a diametrical straight bore formed in the annular member, an axis of which crosses a line passing through the projection and a center of the disk-like member at an angle $\theta(0° < \theta < 90°)$, and a connecting pin extending through the diametrical straight bore in the annular member and a diametrical bore formed in the rotary shaft of the distributor.

9 Claims, 6 Drawing Figures

SHAFT COUPLER FOR COUPLING A ROTARY SHAFT OF AN IGNITION DISTRIBUTOR TO AN ENGINE CAMSHAFT

FIELD OF THE INVENTION AND RELATED ART STATEMENT

The present invention relates to a shaft coupler, and in particular to a shaft coupler for coupling up a rotary shaft of an ignition distributor to an engine camshaft.

In the related art, there has been provided a shaft coupler comprising a hollow cylindrical member which is provided with a diametrical through bore. The rotary shaft of the ignition distributor is provided at a distal end portion thereof with a diametrical through bore. The rotary shaft is loosely received within an axial through bore of the hollow cylindrical member so that the diametrical through bore of the rotary shaft is aligned with the diametrical through bore of the hollow cylindrical member. The hollow cylindrical member is connected to the rotary shaft by means of a connecting pin which extends through the aligned bores of the hollow cylindrical member and the rotary shaft.

The hollow cylindrical member is provided at one axial end surface thereof with a pair of projections which are spaced from each other and diametrically aligned to each other. A line passing through these projections is perpendicular to an axis of the diametrical through bore of the hollow cylindrical member. The projection of the hollow cylindrical member are partially received within a diametrical groove formed on a top end of the engine camshaft.

According to the construction described above, a relative offset between the axes of the hollow cylindrical member and the engine camshaft can be absorbed by a diametrical relative movement of the projections of the hollow cylindrical member against the groove on the top end of the engine camshaft. Accordingly, a rotation of the engine camshaft is smoothly transmitted to the rotary shaft of the distributor. In case that the axes of the hollow cylindrical member and the engine camshaft are offset from and parallel to each other, the above construction can sufficiently absorb such offset. However, in case that the axes of the hollow cylindrical member and the engine camshaft are not parallel to each other, which may often taken place practically, such offset can not be absorbed sufficiently by the above construction. In order to avoid such insufficient absorption of the axes offset, proposed is a coupler in which the width of the projection of the hollow cylindrical member is reduced smaller than the width of the groove on the engine camshaft. The loose fitting of the coupler to the engine camshaft, i.e. the gap between the projection and the groove can absorb the axes offset, but to the contrary causes the problem that the ignition can be done neither accurately not timely.

SUMMARY OF THE INVENTION

An object of the present invention is to provide a shaft coupler which can not only absorb any axes offset between the engine camshaft and the driven rotary shaft of the ignition distributor, but couple the driven rotary shaft of the distributor to the engine camshaft without any backlash.

According to the present invention, there is provided a coupler for coupling a rotary shaft of an ignition distributor to an engine camshaft in an internal combustion engine, said coupler comprising:

an annular member provided at a centre portion thereof with a circular axial recess, a diameter of which is larger than a diameter of the rotary shaft of the ignition distributor, whereby the rotary shaft loosely projects into said recess over one axial end of said annular member;

at least one projection provided on the other axial end of said annular member, said projection being slidably movable along and swingable within a diametrical groove formed on a top end of said engine camshaft;

a straight bore diametrically extending through said annular member, an axis of said straight bore crossing a line passing through said projection and a centre of said annular member at a cross angle $\theta$ which is more than 10° and less than 85°; and connecting pin means extending through said straight bore and a diametrical bore formed at a distal end portion of the rotary shaft of the ignition distributor.

The above and other objects, and features of the present invention will be apparent from the following description of the preferred embodiments when considered in connection with the accompanying drawings. DR

DETAILED DESCRIPTION OF THE PREFERRED EMBODIMENTS

Figure 1:
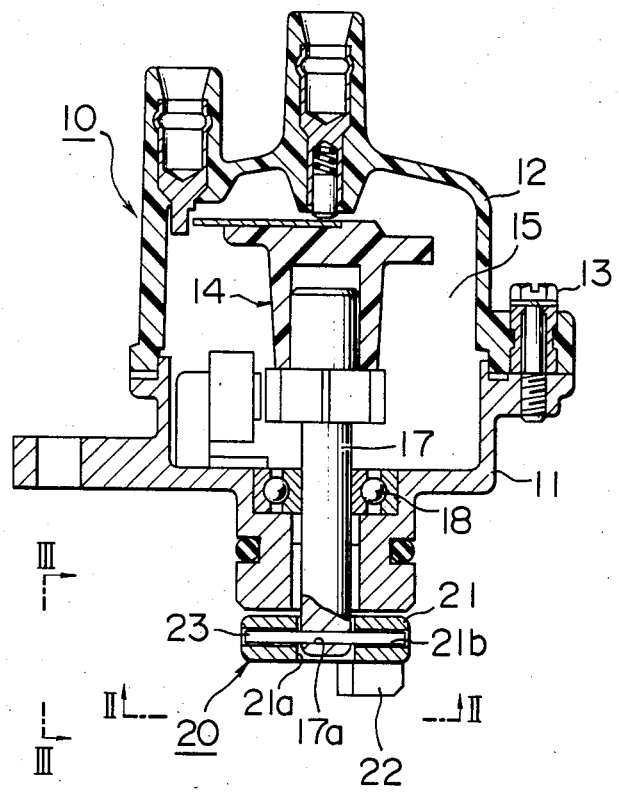
FIG. 1 is a longitudinal sectional view of an igntion distributor to which a coupler embodying the present invention is applied.

Referring to FIG. 1, an ignition distributor 10 to which a coupler 20 embodying the present invention is applied is shown. The distributor 10 comprises a housing 11 and a cap 12 which is tightly mounted onto the housing 11 by means of bolts 13. A rotor 14 is disposed within a space 15 defined by the housing 11 and the cap 12. A rotary shaft 17 is connected at one end portion thereof to the rotor 14 and is borne by a bearing 18 which is mounted on the housing 11. The other end portion of the rotarty shaft 17 projects out of the housing 11 and is provided with a diametrical bore 17a.

Figure 2:
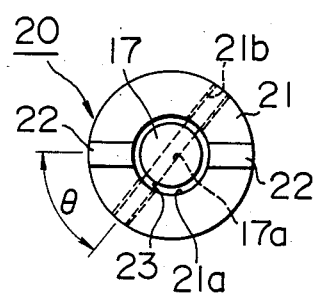
FIG. 2 is a bottom view of the coupler taken along the line II—II of FIG. 1.
Figure 3:
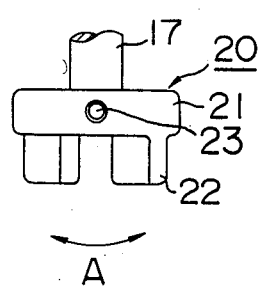
FIG. 3 is a fragmentary side view taken along the line III—III of FIG. 1

As shown in FIGS. 1 and 2, the coupler 20 comprises an annular member 21 having an axial through bore 21a, and a pair of projections 22, 22 provided on one end of the member 21. The projections 22, 22 are spaced from each other and diametrically aligned to each other. The member 21 is also provided therein with a diametrical bore 21b. The axis of the diametrical bore 21b crosses at an angle $\theta$ the line passing through the projections 22, 22 and a centre of the member 21. The other end portion of the rotary shaft 17 is loosely received in the axial bore 21a of the member 21. The rotary shaft 17 is connected to the coupler 20 by means of a connecting pin 23 which is press fitted into the diametrical bore 17a and loosely extends through the bore 21b. Accordingly the coupler 20 is capable of swinging about an axis of the connecting pin 23 in opposite directions designated by an arrow A shown in FIG. 3.

Figure 4:
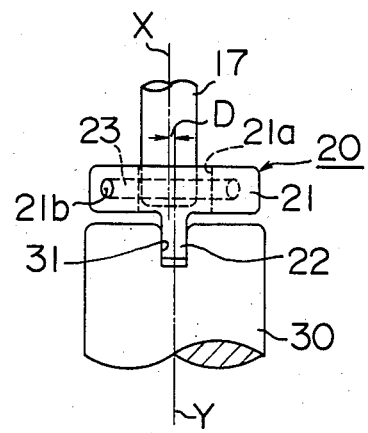
FIGS. 4 and 5 are fragmentary side views showing connections between the coupler and the engine camshaft.

The projections 22, 22 are slidably and closely received in a cooperating diametrical groove 31 formed on a top end of an engine camshaft 30, as shown in FIG. 4.

FIG. 4 shows a condition in that the axes X, Y of the rotary shaft 17 and the engine camshaft 30 are parallel to each other but are offset from each other by a distance D. In this case, the coupler 20 can move along the connecting pin 23 relative to the rotary shaft 17, so that the parallel axes offset D is absorbed efficiently.

Figure 5:
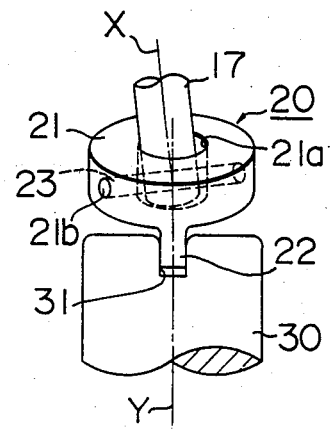

FIG. 5 shows a condition that the axes X, Y of the rotarty shaft 17 and the engine camshaft 30 are not parallel to each other and cross each other at a certain angle. In this case, the coupler 20 swings about the axis of the connecting pin 23, so that the projections 22, 22 are inclined in respect of a plane which includes the axis X of the rotary shaft 17 and the axis of the connecting pin 23. Then the projections 22, 22 can engage smoothly with the groove 31 on the top end of the engine camshaft 30. The cross offset is also absorbed efficiently.

The above offset absorption requires that the axis of the connecting pin 23, i.e. the axis of the diametrical bore 21b crosses a line passing through the projections 22 and the centre of the member 21 at an angle $\theta$ which is more than 0° and is less than 90°, i.e. $0° < \theta < 90°$. However, in extreme conditions, i.e. $\theta$ is approximate to 0° or 90°, the offset absorption is not done efficiently. The practical angle $\theta$ is more than 10° and is less than 85° ($10° < \theta < 85°$). Furthermore, it is preferable that the angle $\theta$ is more than 30° and is less than 80° ($30° < \theta < 80°$).

Figure 6:
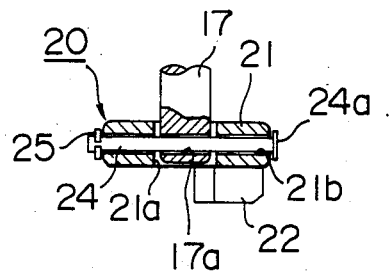
FIG. 6 is a sectional view of another coupler embodying the present invention.

In the above embodiment, the connecting pin 23 is press fitted into the diametrical bore 17a of the rotary shaft 17, and loosely extends through the diametrical bore 21b of the member 21. To the contrary, it may be possible to press fit the connecting pin 23 into the diametrical bore 21b of the member 21 and make the connecting pin 23 extend loosely through the diametrical bore 17a of the rotary shaft 17. Furthermore, as shown in FIG. 6, it may be possible to make the connecting pin 24 extend loosely through the diametrical bores 17a and 21b, which is provided at one end thereof with a flange portion 24a. A retaining ring 25 engages with an annular recess formed on the other end portion of the connecting pin 24. The retaining ring 25 cooperates with the flange portion 24a so as to prevent the connecting pin 24 from falling off from the coupler 20. In these case, the rotation of the engine camshaft 30 is also fully transmitted to the rotary shaft 17 through the coupler 20.

I claim:

1. A coupler for coupling a rotary shaft of an ignition distributor to an engine camshaft in an internal combustion engone, said coupler comprising:
    an annular member provided at a centre portion thereof with a circular axial recess, a diameter of which is larger than a diameter of the rotary shaft of the ignition distributor, whereby the rotary shaft loosely projects into said recess at one axial end of said annular member;
    at least one projection provided on the other axial end of said annular member, said projection being slidably movable along and inclinable within a diametrical groove formed on a top end of said engine camshaft;
    a straight bore diametrically extending through said annular member, an axis of said straight bore crossing a line passing through said projection in a centre of said annular member at a cross angle $\theta$ which is more than about 10° and less than about 85°; and
    connecting pin means extending through said straight bore and a diametrical bore fixed at a distal end portion of the rotary shaft of the ignition distributor.

2. A coupler according to claim 1, wherein said axis recess of said annular member is a through bore.

3. A coupler according to claim 2, wherein said cross angle $\theta$ ranges from 30° to 80°.

4. A coupler for transmitting rotary motion to a rotary shaft of an ignition distributor from an engine camshaft in an internal combustion engine regardless of misalignment of the axes of said shafts, said coupler comprising:
    an annular member provided at a centre portion thereof with a circular axial recess, a diameter of which is larger than a diameter of the rotary shaft of the ignition distributor, whereby the rotary shaft loosely projects into said recess at one axial end of said annular member;
    at least one projection provided on the other axial end of said annular member, said projection being disposed along a first diametrical axis of said annular member and being slidably movable along and inclinable within a diametrical groove formed on a top end of said engine camshaft;
    a straight bore diametrically extending through said annular member; and
    connecting pin means extending through said straight bore and a diametrical bore formed at a distal end portion of the rotary shaft of the ignition distributor;
    said straight bore having a longitudinal axis which passes through a center of said annular member and crosses said first diametrical axis at a substantial acute angle for transmitting rotation of said camshaft to said rotary shaft regardless of parallel or cross angle offset of said camshaft and said rotary shaft axes by relative movement between said annular member and said rotary shaft along said longitudinal axis of said straight bore to absorb said parallel offset and by concurrent motion of relative inclination of said projection and said groove and relative rotation of said rotary shaft and said annular member about said longitudinal axis.

5. A coupler as in claim 4 wherein said acute angle is more than about 10° and less than about 85°.

6. A coupler as in claim 4 wherein said acute angle is in a range from about 30° to about 80°.

7. A coupler as in claim 4 wherein said connecting pin means loosely extends through said straight bore and provides a press fit for said diametrical bore of the rotary shaft.

8. A coupler as in claim 4 wherein said connecting pin means is press fit into said straight bore and provides a loose fit for said diametrical bore of the rotary shaft.

9. A coupler as in claim 4 wherein said connecting pin means loosely fits both said straight bore and said diametrical bore of the rotary shaft and has means on both ends for retaining the connecting means in said straight and diametrical bores.

* * * * *